(12) United States Patent
Branco et al.

(10) Patent No.: US 12,373,670 B2
(45) Date of Patent: *Jul. 29, 2025

(54) INTERLEAVED SEQUENCE RECURRENT NEURAL NETWORKS FOR FRAUD DETECTION

(71) Applicant: Feedzai—Consultadoria e Inovação Tecnológica, S.A., Coimbra (PT)

(72) Inventors: Bernardo José Amaral Nunes de Almeida Branco, Lisbon (PT); Pedro Caldeira Abreu, London (GB); Ana Sofia Leal Gomes, Lisbon (PT); Mariana S. C. Almeida, Lisbon (PT); João Tiago Barriga Negra Ascensão, Lisbon (PT); Pedro Gustavo Santos Rodrigues Bizarro, Lisbon (PT)

(73) Assignee: Feedzai—Consultadoria e Inovação Tecnológica, S.A. (PT)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,142

(22) Filed: Apr. 16, 2024

(65) Prior Publication Data

US 2024/0303468 A1  Sep. 12, 2024

Related U.S. Application Data

(63) Continuation of application No. 17/174,046, filed on Feb. 11, 2021, now Pat. No. 11,989,643.
(Continued)

(51) Int. Cl.
*G06Q 40/12* (2023.01)
*G06F 7/08* (2006.01)
(Continued)

(52) U.S. Cl.
CPC ............... *G06N 3/045* (2023.01); *G06F 7/08* (2013.01); *G06F 16/2379* (2019.01);
(Continued)

(58) Field of Classification Search
None
See application file for complete search history.

(56) References Cited

U.S. PATENT DOCUMENTS 6,330,546 B1 * 12/2001 Gopinathan .......... H04M 15/47
                                                        705/38
9,747,288 B1 *  8/2017 Beckford ............ G06F 16/2365
(Continued)

OTHER PUBLICATIONS

Abdallah et al., Fraud Detection System: A Survey, Journal of Network and Computer Applications 68 (2016) 90-113, Apr. 13, 2016.
(Continued)

*Primary Examiner* — Fateh M Obaid
(74) *Attorney, Agent, or Firm* — Van Pelt, Yi & James LLP

(57) ABSTRACT

A process for handling interleaved sequences using RNNs includes receiving data of a first transaction, retrieving a first state (e.g., a default or a saved RNN state for an entity associated with the first transaction), and determining a new second state and a prediction result using the first state and an input data based on the first transaction. The process includes updating the saved RNN state for the entity to be the second state. The process includes receiving data of a second transaction, where the second transaction is associated with the same entity as the first transaction. The process unloops an RNN associated with the saved RNN state including by: retrieving the second state, determining a new third state and a prediction result using the second state and an input data based the second transaction, and updating the saved RNN state for the entity to be the third state.

20 Claims, 8 Drawing Sheets

Related U.S. Application Data

(60) Provisional application No. 62/975,614, filed on Feb. 12, 2020.

(51) Int. Cl.
| | |
|---|---|
| *G06F 16/23* | (2019.01) |
| *G06F 16/27* | (2019.01) |
| *G06N 3/042* | (2023.01) |
| *G06N 3/044* | (2023.01) |
| *G06N 3/045* | (2023.01) |
| *G06N 3/063* | (2023.01) |
| *G06N 3/08* | (2023.01) |
| *G06Q 20/40* | (2012.01) |

(52) U.S. Cl.
CPC ............. *G06F 16/27* (2019.01); *G06N 3/042* (2023.01); *G06N 3/044* (2023.01); *G06N 3/063* (2013.01); *G06N 3/08* (2013.01); *G06Q 20/4016* (2013.01); *G06Q 20/409* (2013.01); *G06Q 40/12* (2013.12)

(56) References Cited

U.S. PATENT DOCUMENTS

| | | | | |
|---|---|---|---|---|
| 10,482,466 | B1* | 11/2019 | Walters | G06N 3/084 |
| 10,990,645 | B1 | 4/2021 | Shi | |
| 11,282,077 | B2* | 3/2022 | Fenton | G06Q 20/2295 |
| 11,290,452 | B2* | 3/2022 | Leddy, III | G06Q 20/38215 |
| 11,410,047 | B2* | 8/2022 | Ben Kimon | G06Q 20/4016 |
| 11,423,143 | B1* | 8/2022 | Lin | G06F 21/552 |
| 11,431,741 | B1* | 8/2022 | Lin | H04L 63/1425 |
| 11,451,670 | B2* | 9/2022 | Ahmadi | G06F 18/24133 |
| 2001/0037321 | A1* | 11/2001 | Fishman | G06Q 99/00 705/500 |
| 2003/0062411 | A1 | 4/2003 | Chung | |
| 2003/0208439 | A1* | 11/2003 | Rast | G06Q 20/403 705/38 |
| 2004/0088298 | A1* | 5/2004 | Zou | G06F 16/27 |
| 2007/0204033 | A1* | 8/2007 | Bookbinder | G06Q 10/10 709/224 |
| 2013/0110766 | A1* | 5/2013 | Promhouse | G06F 16/2468 707/607 |
| 2014/0105488 | A1 | 4/2014 | Geng | |
| 2016/0012135 | A1 | 1/2016 | Wang | |
| 2017/0011085 | A1* | 1/2017 | Douros | G06F 16/275 |
| 2017/0230404 | A1* | 8/2017 | Ramos de Araujo | H04L 63/1433 |
| 2018/0075082 | A1* | 3/2018 | Sawhney | G06F 16/2379 |
| 2021/0192524 | A1* | 6/2021 | Saleh | G06Q 20/4016 |
| 2021/0200955 | A1* | 7/2021 | Ben Kimon | G06N 3/044 |
| 2022/0383168 | A1 | 12/2022 | Wang | |

OTHER PUBLICATIONS

Ando et al., Detecting Fraudulent Behavior Using Recurrent Neural Networks, Computer Security Symposium 2016, Oct. 11-13, 2016, pp. 805-810.
Arun Mannaly, HaloDB, A Fast, Log Structured Key-Value Store, 2018.
Author Unknown, Third Party Submission, Jan. 5, 2022.
Bahnsen et al., Feature Engineering Strategies for Credit Card Fraud Detection, Expert Systems with Applications 51 (2016) 134-142.
Benard Jacobus Wiese, Credit Card Transactions, Fraud Detection, and Machine Learning: Modelling Time with LSTM Recurrent Neural Networks, Aug. 2007.
Bhattacharyya et al., Data Mining for Credit Card Fraud: A Comparative Study, Decision Support Systems 50 (2011) 602-613, Aug. 18, 2010.
Bolton et al., Statistical Fraud Detection: A Review, Statistical Science, 2002, vol. 17, No. 3, 235-255.
Brebisson et al., Artificial Neural Networks Applied to Taxi Destination Predication, Sep. 21, 2015.
Chen et al., XGBoost: A Scalable Tree Boosting System, KDD '16, Aug. 13-17, 2016, 785-794, San Francisco, CA, USA.
Cho et al., Learning Phrase Representations Using RNN Encoder-Decoder for Statistical Machine Translation, Sep. 3, 2014.
Facebook, Welcome to RocksDB, Jun. 13, 2020.
Feedzai, This is a Story about What Happens when Deep Learning and Fraud Detection Come Together. <hubs.ly/H0l5jqwO>. Oct. 5, 2019.
Google, Data Preparation and Feature Engineering in ML, Jul. 11, 2019.
Guo et al., Neural Data Mining for Credit Fraud Detection, Proceedings of the Seventh International Conference on Machine Learning and Cybernetics, Kunming, Jul. 12-15, 2008.
Hochreiter et al., Long Short-Term Memory, Neural Computation 9(8):1735-1780, 1997.
Howard Chu, MDB: A Memory-Mapped Database and Backend for OpenLDAP, Symas Corp., OpenLDAP Project, 2011.
Jason Brownlee, A Gentle Introduction to RNN Unrolling, Machine Learning Mastery, Sep. 6, 2017.
Johannes Jurgovsky, Context-Aware Credit Card Fraud Detection, Sep. 2019.
Jurgovsky et al., Sequence Classification for Credit-card Fraud Detection, Expert Systems with Applications 100 (2018) 234-245, Jan. 23, 2018.
Ke et al., LightGBM: A Highly Efficient Gradient Boosting Decision Tree, 31st Conference on Neural Information Processing Systems (NIPS 2017), Long Beach, CA, USA.
Lecun et el., Deep Learning, ResearchGate, Nature, vol. 521, May 28, 2015, pp. 436-444.
Li et al., A Time Attention based Fraud Transaction Detection Framework, Mar. 27, 2020, pp. 1-7.
Li et al., Transaction Fraud Detection Using GRU-centered Sandwich-structured Model, 2017.
Li et al., Transaction Fraud Detection Using GRU-centered Sandwich-structured Model, May 2018.
Long et al., Fully Convolutional Networks for Semantic Segmentation, Mar. 8, 2015.
Nic Watson, Universal Python Binding for the LMDB "Lightning" Database, 2011.
Nilson, Card Fraud Losses Reach $27.85 Billion, Posted Nov. 18, 2019, Issue 1164, Nov. 2019.
Oneil et al., The Log-Structured Merge-Tree (LSM-Tree), Acta Inf. 33, 4 (1996), pp. 351-385.
Pedro Abreu, Casting Deep Learning Nets on Financial Crime, from <https://feedzai.com/blog/casting-deep-nets-on-financial-crime/>, Sep. 2019.
Pedro Caldeira Abreu, Casting Deep Nets on Financial Crime, Jan. 16, 2019.
Pedro Caldeira Abreu, Images 1-1 through 3-6, Jan. 16, 2019.
Pinto et al., Automatic Model Monitoring for Data Streams, KDD-ADF-2019—Aug. 5, 2019, Aug. 12, 2019.
Rumelhart et al., Learning Representations by Back-Propagating Errors, Nature 323, 6088 (1986), 533-536.
Schmidhuber et al., Deep Learning in Neural Networks: An Overview, Oct. 8, 2014, pp. 1-88.
Tensorflow, Model Optimization, Jan. 11, 2021.
Whitrow et al., Transaction Aggregation as a Strategy for Credit Card Fraud Detection, 2009, Data Mining and Knowledge Discovery 18 (Feb. 2009), pp. 30-55.

* cited by examiner

INTERLEAVED SEQUENCE RECURRENT NEURAL NETWORKS FOR FRAUD DETECTION

CROSS REFERENCE TO OTHER APPLICATIONS

This application is a continuation of U.S. patent application Ser. No. 17/174,046 entitled INTERLEAVED SEQUENCE RECURRENT NEURAL NETWORKS FOR FRAUD DETECTION filed Feb. 11, 2021, now U.S. Pat. No. 11,989,643, which is incorporated herein by reference for all purposes, which claims priority to U.S. Provisional Patent Application No. 62/975,614 entitled INTERLEAVED SEQUENCE RECURRENT NEURAL NETWORKS FOR FRAUD DETECTION filed Feb. 12, 2020, which is incorporated herein by reference for all purposes.

BACKGROUND OF THE INVENTION

Sensitive data is increasingly being transmitted over the Internet for example by point of sale systems at physical store locations, automated teller machines at bank branches as well as transactions associated with online shops and banks. Electronic security measures analyze transactional data to detect a security breach. Modern fraud detection systems typically combine rule-based systems with machine learning classification models to score transactions. For example, a machine learning classification model and rules are used to classify and interpret transactional data to predict whether transactions are legitimate or fraudulent. Those transactions that are potentially fraudulent are forwarded to security analysts for further review. However, conventional systems use machine learning classification models that require significant computing resources and consequently can be inefficient or slow.

BRIEF DESCRIPTION OF THE DRAWINGS

Various embodiments of the invention are disclosed in the following detailed description and the accompanying drawings.

DETAILED DESCRIPTION

Figure 1:
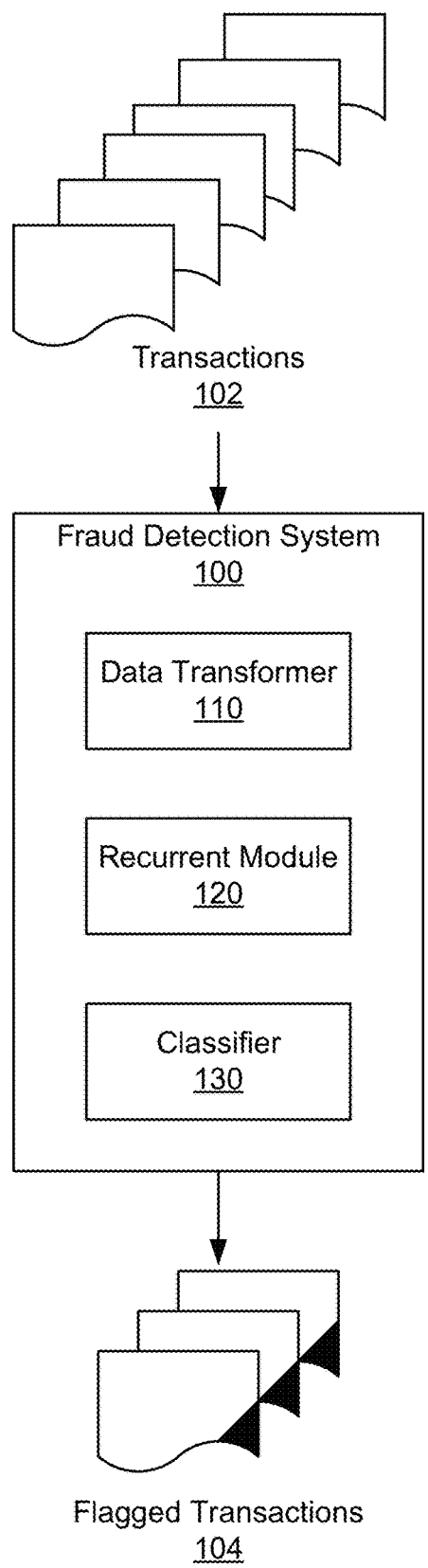
FIG. 1 is a block diagram illustrating an embodiment of a system for fraud detection.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventional fraud detection systems typically use tree-based learners, which tend to require large amounts of computational resources (memory and processing cycles) as well as experts with domain knowledge. Tree-based learners rely heavily on data augmentation in the form of feature engineering to capture the usage patterns (or profiles) of cardholders. However, profiles pose several challenges since they need to be created iteratively in the model development cycle and efficiently stored, accessed, and maintained in production.

An alternative to using tree-based learners is to leverage Deep Learning (DL) because Deep Learning can produce state-of-the-art results in many areas without requiring extensive (or any) feature engineering. Recurrent Neural Networks (RNNs) such as Long Short-Term Memory (LSTM) and Gated Recurrent Unit (GRU) are DL architectures addressing sequences and are particularly well-suited for time-series data. However, traditional fraud detection techniques do not use RNNs because they do not work well with typical transaction sequences, which tend to be composed of multiple, interleaved, unbounded sequences. More specifically, it is challenging to manage the internal RNN state for sequences that have these characteristics and is even more challenging for mission-critical settings such as fraud detection.

Embodiments of RNNs adapted for interleaved sequences (which are suitable for fraud detection) are disclosed. In various embodiments, GRUs are used to build fraud detection models without requiring intermediate feature engineering. They can be deployed in mission-critical, streaming systems with millisecond latency needs. In various embodiments, a process for fraud detection (or more generally, making a prediction or classification determination) using RNNs includes.

FIG. 1 is a block diagram illustrating an embodiment of a system for fraud detection. Fraud detection system 100 receives transactions 102 and processes the transactions to determine actions (if any) to take with respect to the transactions. For example, if the fraud detection system determines that a transaction is potentially fraudulent, the system outputs an alert about one or more transactions 104 that are potentially fraudulent to have the transaction(s) be reviewed further.

In various embodiments, fraud detection system 100 is designed to detect fraud and similar security breaches in online transactions such as purchases. In a typical scenario, a fraudster obtains a payment instrument (such as by using a credit card skimmer at a point of sale device) and then tries to make unauthorized purchases using that payment instrument. Sometimes the legitimate cardholder detects the illicit usage and requests a chargeback or otherwise initiates a dispute to be reimbursed. Sometimes a merchant, credit card issuer, bank, or other entity involved in transaction processing uses a fraud detection system such as fraud detection system 100 to detect and prevent fraudulent transactions.

The effectiveness of a fraud detection system depends on its ability to quickly and accurately detect and prevent a fraudster from successfully completing a purchase or transaction. An effective fraud detection system preferably detects the fraud prior to a legitimate cardholder reporting the fraud or some other financial loss to a merchant, credit card issuer, bank, or other entity involved in the transaction. Ideally, the fraudster is thwarted by having the payment instrument declined when they try to use it.

Fraud detection system 100 receives transactions 102, makes predictions about the transactions such as whether they are fraudulent or legitimate, and outputs one or more flagged transactions 104. The flagged transactions 104 may be those that are potentially fraudulent, so the fraud detection system forwards them to a human or automated analyst, who investigates the transaction and makes a final decision about what action to take.

Unlike conventional fraud detection systems, system 100 is optimized by using a recurrent neural network to classify events and detect fraud. As further described herein, system 100 includes a data transformer 110, recurrent module 120, and classifier 130 that cooperate to perform the disclosed techniques including the process of FIG. 2. System 100 is efficient during both offline training and online, streaming classification.

Figure 7:
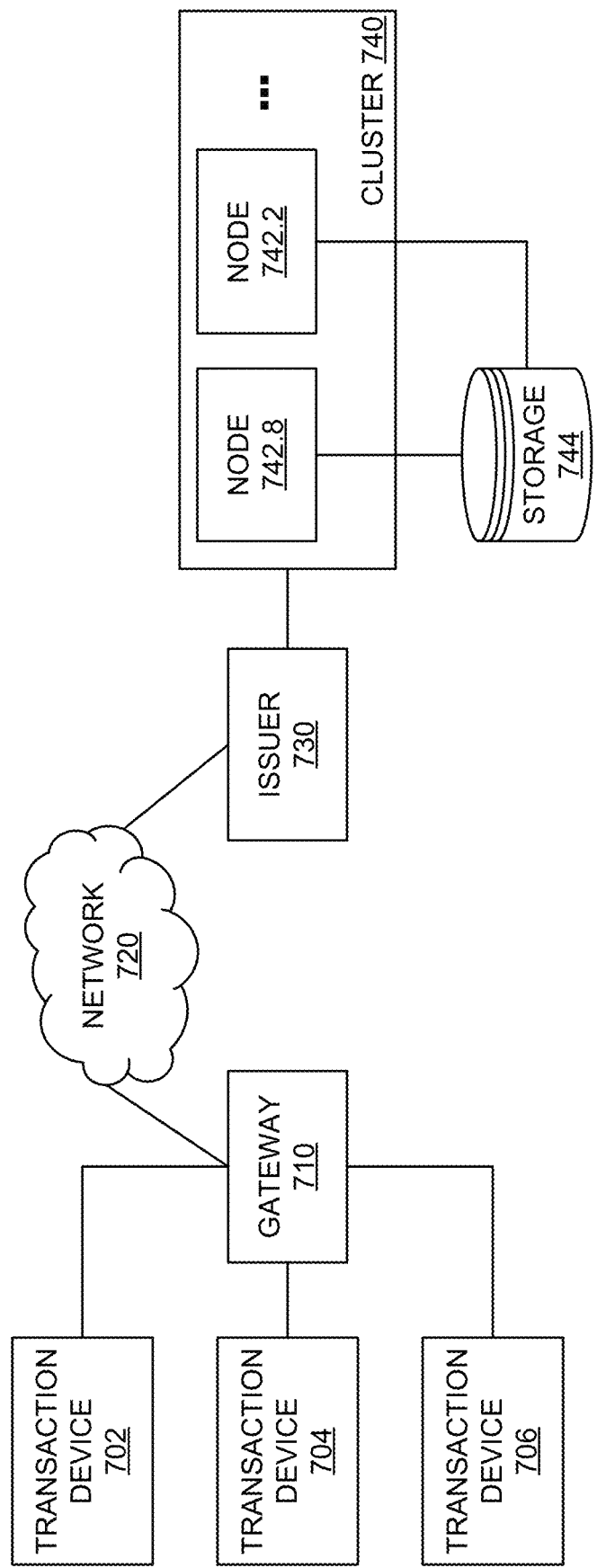
FIG. 7 is a block diagram illustrating an embodiment of a system in which interleaved sequence RNNs can be implemented.

The disclosed techniques can be implemented by system 100 to better recognize fraudulent transactions and/or legitimate transactions. Merchants, customers, financial institutions, and government agencies and others who suffer fraud-related losses including credit card theft and other scams would benefit from the techniques disclosed herein. A more detailed example of an environment in which a fraud detection system can be used is shown in FIG. 7.

Figure 2:
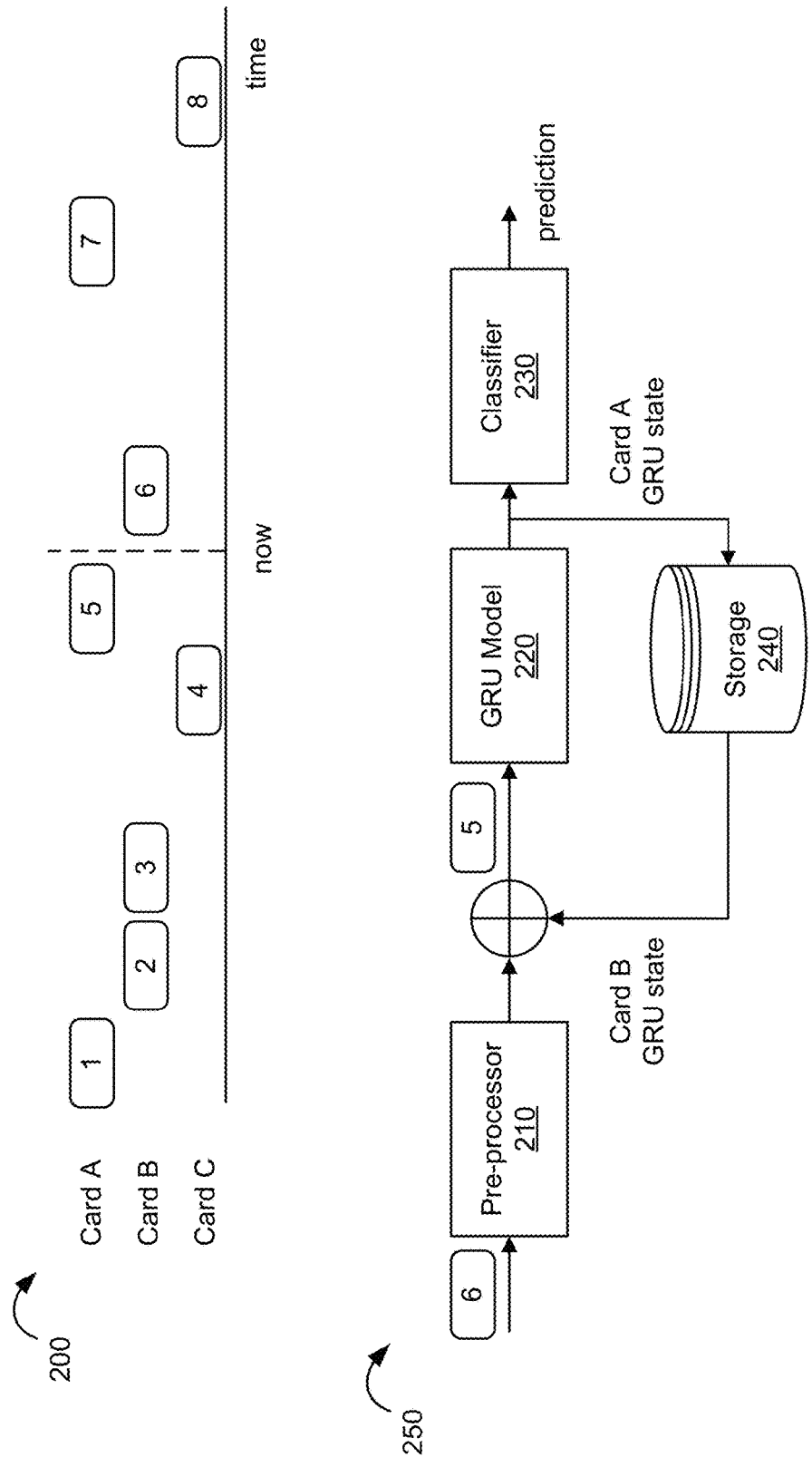
FIG. 2 is a block diagram illustrating an embodiment of a recurrent neural network system for fraud detection.

FIG. 2 is a block diagram illustrating an embodiment of a recurrent neural network system for fraud detection. Recurrent neural network system 250 will be explained using the example of data stream 200. Data stream 200 exhibits the characteristics typically seen in fraud detection scenarios: the stream is composed of many interleaved, unbounded sub-sequences (e.g., the history of each card) with irregular time intervals between transactions. Here, the stream interleaves data from three different cards (A, B, and C). Transaction 1 is associated with Card A, Transactions 2 and 3 are associated with Card B, and so on Transaction 4 is associated with Card C, and so on. In other words, an interleaved sequence of transactions includes transactions received in an order in which adjacent transactions are not necessarily associated with the same entity.

System 250 includes pre-processor 210, Gated Recurrent Unit (GRU) model 220, classifier 230, and storage 240. Pre-processor 210 (sometimes also called a feature engineering and transformation block) is an example of data transformer 110. The pre-processor is configured to process data and can be performed prior to or substantially concurrently with fetching the data. The GRU model 220 is an example of recurrent module 120. The GRU model is configured to store one or more states associated with an entity (Card in this example). The classifier 230 is an example of classifier 130. The classifier is configured to make a prediction about the input transaction using output (state associated with an entity) from the GRU model.

Suppose at the present time (indicated by "now" in FIG. 2), transaction 5 has just been received and transaction 6 is coming in. Transaction 5 is associated with Card A, so system 250 processes this transaction by performing the process of FIG. 3 to look up Card A GRU state (e.g., joining Transaction 5 with Card A GRU state) and output a prediction about that transaction using Card A GRU state. The system 250 also updates Card A GRU state based on Transaction 5, as further described herein.

Figure 3:
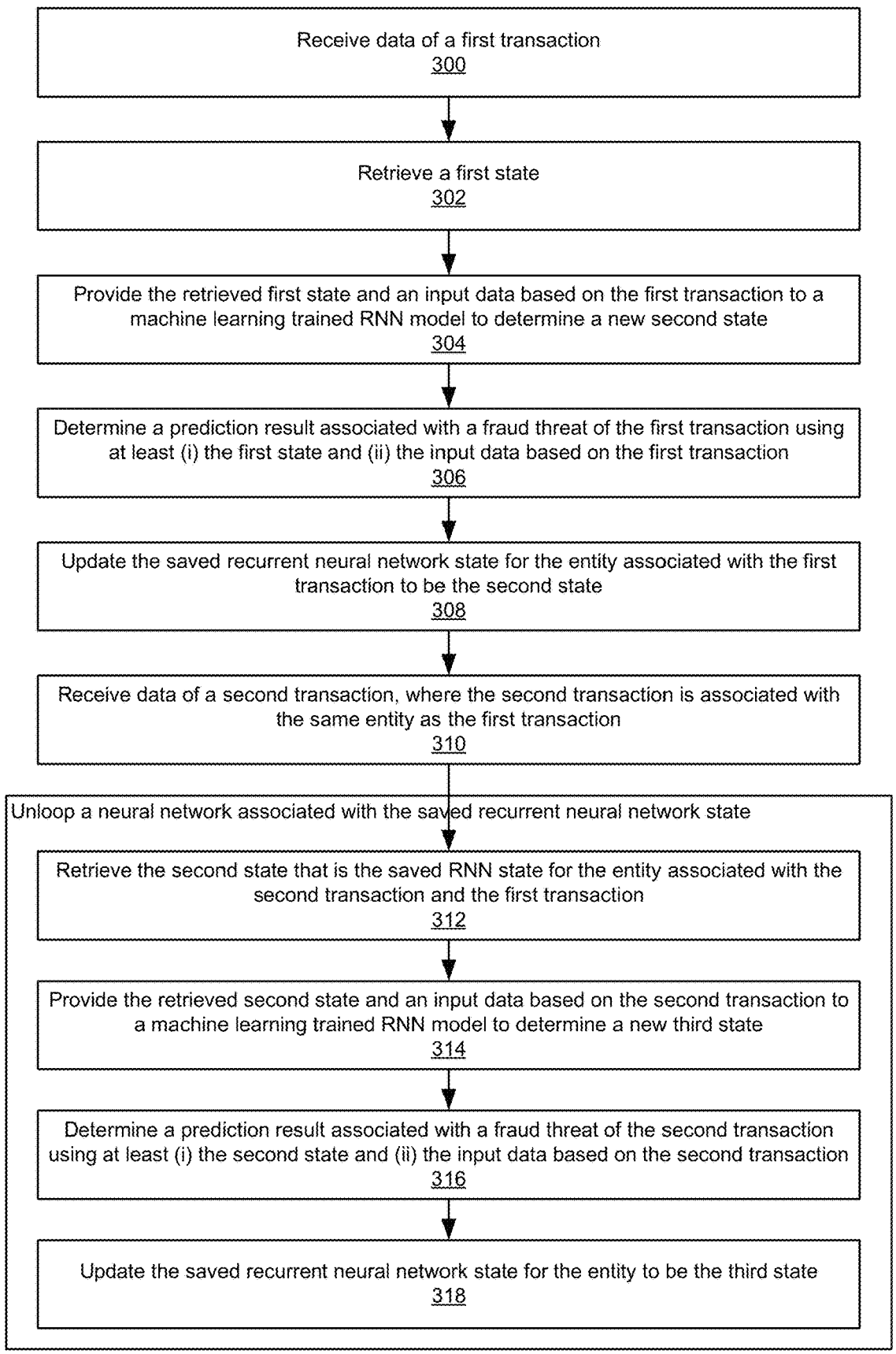
FIG. 3 is a flow diagram illustrating an embodiment of a process for fraud detection using a recurrent neural network.

Transaction 6 is associated with Card B, so system 250 processes this transaction by performing the process of FIG. 3 to look up Card B GRU state (e.g., joining Transaction 6 with Card B GRU state) and output a classification about that transaction using Card B GRU state. The system 250 also updates Card B GRU state based on Transaction 6, as further described herein.

Storage 240 is configured to store states associated with entities (e.g., Card A GRU state, Card B GRU state, etc.) In various embodiments, the storage includes one or more databases, which can be centrally stored or embedded. The storage optionally includes a cache, which may increase the speed of lookups.

Although this example discusses cards, the disclosed techniques may be applied similarly to data associated with other entities such as merchants, terminals or the like.

FIG. 3 is a flow diagram illustrating an embodiment of a process for fraud detection using a recurrent neural network. The process can be implemented by fraud detection system 100, system 400, cluster 740, or device 800. The terms "transactions" and "events" are used interchangeably since transactions (e.g., payments) arrive in real-time systems in the form of events. For simplicity, the process is described for processing two transactions. The process can be repeated for any number of transactions. The transactions may be part of an interleaved sequence of any length.

The process begins by receiving data of a first transaction (300). In various embodiments, the process assumes a supervised learning setting. Each instance is a transaction (event) denoted by a vector x labeled as fraudulent, y=1, or legitimate, y=0. The vector x can encode more or less information depending on the use case. By way of non-limiting example, vector x includes one or more of the following:

$N_n$ numerical fields $x_{ni}$, i=1 to $N_n$, containing at least the amount involved in the transaction, but also possibly other fields (e.g., the geo-location coordinates of the transaction or the number of items purchased);

$N_c$ categorical fields $x_{cj}$, j=1 to $N_c$, e.g., strings, such as the merchant category code (MCC), the merchant's name, country code, currency code, or input mode of the card data (e.g., chip, magnetic stripe, manual input, web browser);

$N_t$ timestamp fields $x_{t,k}$, k=1 to $N_t$, containing at least the timestamp of the transaction but also possibly including the expiry and issuing dates of the bank card;

an entity identification field, usually a unique ID of the credit or debit card involved in the transaction, $x_{id}$.

As further described with respect to 308, the process then produces a prediction $\hat{y} \in [0, 1]$ for a subset of instances, also called "scorable instances".

The process retrieves a first state (302). In various embodiments, if the first transaction is associated with an entity that has not been previously seen, then the first state is a default state. The default state can be a predefined/system-selected state that works well for various entities. If the first transaction is associated with an entity that has been previously seen, the first state is a saved recurrent neural network state for an entity associated with the first transaction.

The state encodes the history of events associated with a specific entity and may be useful for classification. For example, the history of events can be encoded to efficiently store a compression of the history of events. Similar events can have different risk levels for different entities, depending on how they compare with the event history of that entity. As an example, a transaction of $10,000 could be legitimate if the non-fraudulent history of the user includes frequent transactions of this amount. In contrast, it may be fraudulent if the history of the user includes only low-amount transactions. This is reflected by modeling the probability of fraud for the ith event from entity k as conditioned on the current and previous events by the same entity. In various embodiments, a recurrent neural network state is stored in a fixed-size vector s that encodes information from past events as follows:

$$P(y^{(i,k)}) = P(y^{(i,k)} | x^{(i,k)}, x^{(i-1,k)}, \ldots, x^{(i,k)}) \quad (1)$$

$$P(y^{(i,k)}) = P(y^{(i,k)} | x^{(i,k)}, s^{(i,k)}) \quad (2)$$

The process provides the retrieved first state and an input data based on data of the first transaction to a machine learning trained recurrent neural network model to determine a new second state (304). In various embodiments, the state associated with entity k after its ith event, denoted above by $s^{(i,k)}$, is assumed to depend only on the state before the event and the data contained in the event. Thus, the following recursive update of the state $s^{(i,k)}$ is performed to compute the model prediction, $\hat{y}^{(i,k)}$:

$$x'^{(i,k)} = f(x^{(i,k)}) \quad (3)$$

$$s^{(i,k)} = g(s^{(i-1,k)}, x'^{(i,k)}) \quad (4)$$

$$\hat{y}^{(i,k)} = h(s^{(i,k)}, x'^{(i,k)}) \quad (5)$$

where $f$ (sometimes called a feature engineering and transformation function) extends and converts the original input vector x into x', with additional features and representing the information in a dense space to feed typical neural networks layers, e.g., fully connected layers or recurrence cells; g is a function (sometimes called a recurrent function) that determines how to update the state after an event; h is a function (sometimes called a classification function) that generates a prediction based on the current event and state.

The process determines a prediction result associated with a fraud threat of the first transaction using at least (i) the first state and (ii) the input data based on the first transaction (306). The prediction result $\hat{y}$ can be determined according to business logic, which business logic can be predefined depending on a particular use case. By way of non-limiting example, the prediction result is a score within the range 0-1, but any type of prediction result can be determined. In various embodiments, the prediction result is used to approve or block the transaction based on whether this prediction is above a certain threshold, $y_{thr}$.

The process updates the saved recurrent neural network state for the entity associated with the first transaction to be the second state (308). In various embodiments, each of the three functions $f$, g, and h contain learnable parameters, which makes RNN models especially suitable for interleaved data streams. GRUs can be used for the recurrent function/block, where each entity is an independent sequence with its state, but sharing the learnable parameters in $f$, g, and h across sequences. With GRUs as the recurrent block, the general process of updating a new state described in equation 4, becomes:

$$r^{(i,k)} = \sigma(W^{(r)} x'^{(i,k)} + U^{(r)} s^{(i-1,k)} + b^{(r)}) \quad (6)$$

$$z^{(i,k)} = \sigma(W^{(z)} x'^{(i,k)} + U^{(z)} s^{(i-1,k)} + b^{(z)}) \quad (7)$$

$$s'^{(i,k)} = \tanh(W x'^{(i,k)} + r^{(i,k)} \odot U s^{(i-1,k)} + b) \quad (8)$$

$$s^{(i,k)} = z^{(i,k)} \odot s^{(i-1,k)} + (1 - z^{(i,k)}) \odot s'^{(i-1,k)} \quad (9)$$

where $r^{(i,k)}$ denotes the reset gate, $z^{(i,k)}$ the update gate and equations 8 and 9 apply them respectively. $U^{(r)}$, $U^{(z)}$, W, U are learnable weight matrices and $b^{(r)}$, $b^{(z)}$, b are learnable bias vectors.

The process receives data of a second transaction, where the second transaction is associated with the same entity as the first transaction (310). For example, for an entity that is a card, the second transaction is associated with the same card as the first transaction.

The process retrieves the second state that is the saved recurrent neural network state for the entity associated with the second transaction and the first transaction (312). The state can be retrieved in the same manner as in 302. The second state was updated at 306.

The process provides the retrieved second state and an input data based on the second transaction to the machine learning trained recurrent neural network model to determine a new third state (314). The new third state can be determined in the same manner as in 304.

The process determines a prediction result associated with a fraud threat of the second transaction using at least (i) the second state and (ii) the input data based on the second transaction (316). The prediction result can be determined in the same manner as 306.

The process updates the saved recurrent neural network state for the entity to be the third state (318). The saved RNN state can be updated in the same manner as 308.

312-318 can be characterized as unlooping or unrolling a neural network associated with the saved recurrent neural state.

In various embodiments, pre-processing is performed on the data of one or more transactions prior to training. The pre-processing can be performed offline or online to convert the data to a desired format and implement the subset of non-learnable transformations. In one aspect, new features may be created and existing ones are transformed into appropriate numerical formats depending on their semantics, effectively transforming an original feature vector x into a processed vector x'. In another aspect, pre-processing sequences transactions by transforming the dataset from one format to another format.

Some examples of pre-processing techniques will be described, but this is not intended to be limiting as other pre-processing techniques may be applied in addition to or in place of the ones described.

Numerical features may be pre-processed as follows. One techniques is applying z-scoring with outlier clipping for features with distributions that are not very skewed and with which the fraud risk is expected to vary smoothly, such as amount in US dollars:

$$x^*_{n_i} = \frac{x_i - \mu_{x_i}}{\sigma_{x_i}} \quad (10)$$

$$x'_{n_i} = \max(\min(x^*_{n_i}, T_o), -T_o) \quad (11)$$

where $\mu_{xi}$ and $\sigma_{xi}$ denote, respectively, the mean and standard deviation of the values of features $x_i$ in the training set, and $T_o$ is the number of standard deviations from the mean above which to consider a value to be an outlier (usually $T_o=3$).

Another numerical feature pre-processing technique is percentile bucketing for features with multimodal distributions, or with which the fraud risk is not expected to vary smoothly, such as latitude or longitude. Percentile bucketing includes creating bins between every pair of consecutive percentiles computed from the training set, and transforming feature values to the index of the bin in which they land:

$$x'_{n_i} = \begin{cases} 0, & \text{if } x_i < p^1_{x_i} \\ 1, & \text{if } p^1_{x_i} \leq x_i < p^2_{x_i} \\ \vdots \\ 99, & \text{if } p^{99}_{x_i} \leq x_i \\ 100, & \text{if } x_i \text{ has a missing or invalid value} \end{cases} \quad (12)$$

where $p_{xi}^k$ denotes the kth percentile computed over the values of feature xi in the training set. These transformed features are interpreted later as categoricals.

Categorical features may be pre-processed as follows. Each categorical feature is indexed by mapping each possible value into an integer based on the number of occurrences in the training set. For a given categorical feature, $x_{cj}$, the lth most frequent value is mapped to the integer $x_{cj}=l-1$. All values below a certain number of occurrences map to the same integer $l_{max}$. Missing values are considered a possible value.

Timestamp features may be pre-processed as follows. The event timestamp feature is transformed into the sine and cosine of its projection into periodic (e.g., daily, weekly, and monthly) seasonality circles, e.g., a timestamp $x_{tk}$ generates:

hour-of-day features $\sin(h_k)$ and $\cos(h_k)$,
day-of-week features $\sin(dw_k)$ and $\cos(dw_k)$,
day-of-month features $\sin(dm_k)$ and $\cos(dm_k)$,
where:

$$h_k = \text{hour\_from\_timestamp}(x_{tk}) \cdot ((2\pi)/24),$$

$$dw_k = \text{day\_of\_week\_from\_timestamp}(x_{tk}) \cdot ((2\pi)/7),$$

$$dm_k = \text{day\_of\_month\_from\_timestamp}(x_{tk}) \cdot ((2\pi)/30),$$

In various embodiments, new features are created by computing the difference between pairs of relevant timestamps, such as differences between (1) current timestamp minus card issue timestamp and (2) current timestamp minus card expiry timestamp.

The features are transformed through the z-scoring and outlier clipping process described with respect to the numerical features pre-processing. In various embodiments, yearly seasonality is not considered because the datasets used to train and evaluate models usually span a maximum of one year.

Entity-based features may be pre-processed as follows. The entity identification field $x_{id}$ is not mapped directly into a new feature. Instead, all transactions are grouped by the entity, each group is sorted chronologically by transaction timestamp, and then the difference to the immediately preceding event within the same group is computed. The value of this feature for the ith event of entity k is:

$$x^*_{\Delta t}{}^{(i,k)} = x_t^{(i,k)} - x_t^{(i-1,k)} \quad (13)$$

where $x_t^{(i,k)}$ denotes the timestamp of the ith event for entity k.

This feature $x^*_{\Delta t}{}^{(i,k)}$ is then treated as a numerical field and transformed into its final version $x'_{\Delta t}$ through the z-scoring and outlier clipping process described with respect to the numerical features pre-processing. In various embodiments, this feature is especially important because of the irregular time intervals between events. Typically, GRUs, by default, assume a constant time interval between time-steps. This irregularity conveys information that must be available to the classifier since it can significantly impact the probability of an event to be fraudulent. A representative example would be the case of ten identical transactions made over ten days or over ten seconds. The latter pattern is more likely to represent fraudulent behavior.

A corner case is the first transaction of an entity. For practicality, the data collection process truncates all sequences at a given point in time in the past. It is impossible to tell whether a transaction was the first one for an entity or if it is the first in the dataset. Hence, the value of this feature is imputed for the first transaction in each sequence in the dataset with a manually-tuned value, usually slightly higher than the average time between consecutive transactions for the same entity (e.g., 30 days).

In various embodiments, pre-processing includes sequencing transactions by transforming the dataset from a format where each row is an event and the order of the rows is random, into a format where: i) each row is a sequence of events, separated with a specific character; ii) within each sequence, the events are sorted chronologically; iii) supports quick random access of sequences to efficiently build training batches. Additionally, as further described below, the training, and batch inference processes may have different requirements in the order in which the sequences should appear, data subsets are generated separately and in different ways according to the various requirements.

Although for purposes of fraud detection models can be trained and evaluated through offline batch processing, for the best user experience (e.g., to meet business service level agreements or SLAs) transactions should be scored in real-time, changing the paradigm into stream processing. There are implications when using batch inference to obtain a realistic, unbiased estimate of the model's performance, as further described herein.

Furthermore, given that the type of data being processed is time-series data, the training procedure should not give an unrealistic advantage to the model trained with historical data. In other words, the model should not be able to extract information in any way from the future. The pre-processing techniques disclosed herein ensure that there is no bias towards models trained with historical data. For example, in various embodiments, each card's transactions are saved in the database by chronological order (and fed to the model in that same order), and standard hyper-parameter search techniques such as cross-validation are not employed.

In various embodiments, the pre-processing pipeline is a sequence of batch jobs (e.g., Apache Spark jobs). These jobs take an entire dataset corresponding to a pre-determined period such as one year, and:
  (1) create time features and/or entity-related features;
  (2) fit and store the transformer objects for normalization, bucketing and indexing based on the training period;
  (3) load and apply all transformers to the training, validation and test datasets;
  (4) turn a list of events into a list of chronologically-sorted sequences of transactions, e.g., using groupBy to group events by the same entity and map(sort_by_event_timestamp) to sort the events within each group chronologically;
  (5) for each of the intended output subsets (training, validation, evaluation), filter out the sequences that do not contain any event in the period of interest;
  (6) store subsets in databases for quick CPU access.

The process of FIG. 3 will now be explained using the system shown in FIG. 4, which describes an example fraud detection system 100 in more detail. According to embodiments of the present disclosure, the fraud detection system 100 includes modules that implement a recurrent neural network to classify transactions as fraud or not fraud (or more granular classifications).

Figure 4:
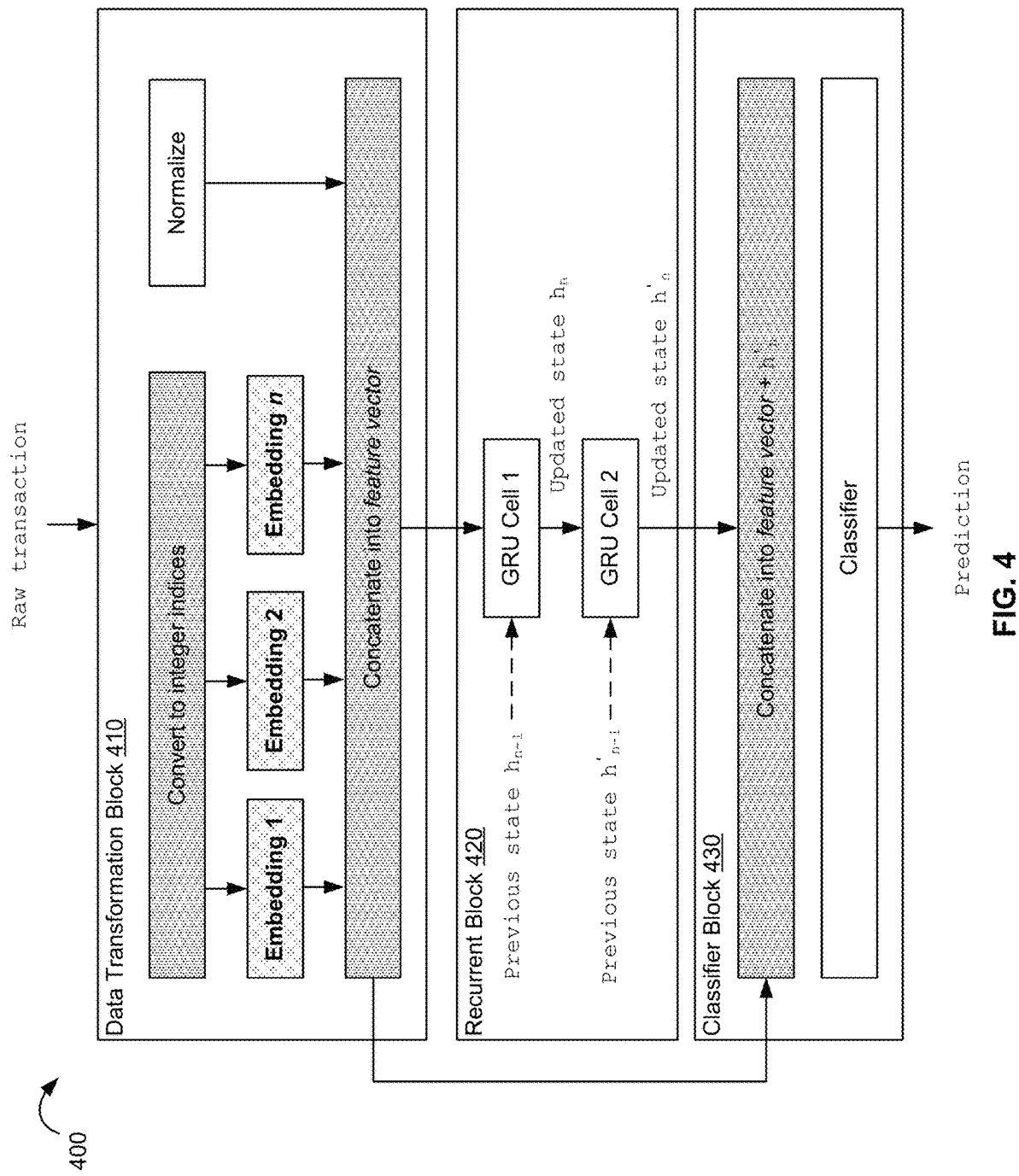
FIG. 4 is a block diagram illustrating an embodiment of a system for fraud detection using a recurrent neural network.

FIG. 4 is a block diagram illustrating an embodiment of a system for fraud detection using a recurrent neural network. System 400 includes a feature engineering and transformation block 410, a recurrent block 420, and a classifier block 430. Some components are referred to as "offline components" because they perform model training, and batch prediction. Some components are referred to as "online components" because they generate predictions for a stream of in-coming transactions under rigorous throughput and latency constraints. The two types of components support the model iteration cycle and the deployment of trained models. First, the architecture and the hyperparameters of the model are adjusted offline. Then, the model is deployed in an environment that fits the production constraints for real-time systems processing transactions.

Feature engineering and transformation block 410 is configured to pre-process data (e.g., a raw transaction) before passing the data to recurrent block 420. The data transformations, denoted by block fin equation 3, are depicted here. The darker-shaded transformations (conversion and concatenation) are not learnable, and as such, can be precomputed before training in the offline scenario, as further described herein. By contrast, the lighter-shaded transformations (embeddings) are learnable and are not precomputed before training. It includes one embedding block per categorical feature which maps integer indices to vectors in a dense space of predefined dimension. A predefined number of mappings can be performed according to memory constraints, e.g., k=10000 most common values for each categorical to their embedding. The remaining values may be mapped to the same embedding.

The transformations are concatenated. The resulting feature vector is passed through a fully connected layer to reduce its dimensionality before feeding it to the recurrent block.

Recurrent block 420 is configured to learn the consumption patterns of the cardholders and embed this information in recurrent states. This block includes one or more GRU cells (e.g., a single GRU or stacked GRUs), where the output of the first becomes the input of the next. The state sizes and number of GRUs may be selected based on the storage capacity of the system. The larger the recurrent states, the larger the required database and resulting resources. As further described herein, in various embodiments, the database has as many entries per card as the number of stacked GRUs. As a result, the recurrent block can be tuned to maximize the fraud detection results while respecting the resource restrictions of the production system. In the example shown here, the recurrent block includes two stacked GRUs.

Classifier block 430 is configured to make a prediction (or classification) of the input raw transaction using the information from one or more previous states. The output of the recurrent block is concatenated with the initial feature vector so that the current prediction, $\hat{y}^{(i,k)}$, depends on $x^{(i,k)}$ directly and through the state $s^{(i,k)}$ as described with respect to 202. This approach differs from conventional RNNs because it effectively "unloops" the RNNs so that residual information that is useful for the current transaction, but not necessarily for future events, does not need to be stored in the hidden state. The concatenated vector passes through several fully connected layers. The classification can be provided in various formats such as a final score indicating likelihood that the transaction is fraudulent.

When processing large datasets (e.g., each dataset occupies several TBs of disk space), access and storage of data can be improved (accelerated) as follows. In various embodiments, an (embedded) key-value store (such as LMDB, RocksDB, or the like) is used to store the training, validation, and test datasets (each subset as a separate database). An embedded key-value store may be attractive because of its read performance. Instead of building random training batches of cards through several separate random reads, for every batch, an index of the database is accessed at random and read sequentially from there on batch size number of entries. This way, the model (system) consistently sees different batches during training in an efficient manner.

In various embodiments, a multi-processing strategy is used where various CPU workers are continuously and concurrently reading batches from the database and inserting them in a queue to be later consumed by the GPU. Batch processing in this manner is beneficial for imbalanced datasets where some batches do not have any fraudulent transactions. By continuously and concurrently reading batches, at every batch, the model sees some fraudulent transactions. Otherwise, back-propagating the gradients derived from a batch with no fraud would result in a model that simply predicts all transactions to be non-fraudulent.

The system builds two distinct databases, one of the cards with no fraudulent transactions (e.g., meeting a first criterion), and another with cards containing at least one fraudulent transaction (e.g., meeting a second criterion). In various embodiments, since the fraudulent database is much smaller than the non-fraudulent one, the fraudulent database is kept in memory (RAM) hence making the fraudulent reads, which occur for every batch, even faster. For the validation dataset, a new database of a random and representative sample of cards from the validation period (typically a month) arranged in descending order in the number of transactions is built. This allows the system to quickly find the batch size that maximizes the GPU's usage, and there is constraint with having the model evaluate the transactions always in the same order.

In a production scenario, an RNN continuously updates its recurrent state from the very first transaction of a card until its most recent one. In the offline batch scenario, forcing a model to classify the entire transactional history of a card may be undesirable for two reasons. Firstly, the transactional history of some cards may be so long that it exceeds the GPU memory, whereas others may have only a few associated transactions. This disparity causes very irregular batches, and an inefficient usage of the GPU memory. Secondly, domain knowledge suggests that one does not need the entire history of a card to decide if the current transaction is fraudulent. Because of this, a cutoff on the number of previous transactions of a card can be used. In various embodiments, this cutoff (threshold) is empirically set, depending on the dataset and use-case, to establish a good compromise between GPU utilization and a sufficient history for the model to distinguish between the user's normal behavior and a fraudulent one. By way of non-limiting example, a suitable cutoff in the payment processor domain is within a range from 100 to 400 previous transactions. Consequently, batches have a fixed size in the number of transactions resulting from the number of cards (batch size) multiplied by the cutoff length. Furthermore, a motivation behind using long sequences is to mimic, as much as possible, the unbounded number of transactions, per card, in production.

Although historical data may include transactions from all of their channels and use-cases, sometimes only scoring transactions from a specific subgroup is of interest. As an example, transactions can be either card-not-present (CNP) for online transactions or card-present (CP) for transactions in physical locations, and a model whose purpose is blocking CNP transactions is desired. Although the model is only scoring CNP transactions, it can still extract valuable information from CP transactions. More concretely, imagine a sequence of successive cash withdrawals followed by online purchases done in a short period. The model would be further inclined to detect this suspicious behavior if it had seen the CP transactions before the CNP ones. In various embodiments, this information is embedded directly into the training procedure through the use of scorable and non-scorable instances. A transaction that the model needs to learn how to classify goes through the typical forward pass, followed by a backward pass, e.g., backpropagation of the respective gradients. For a non-scorable instance, however, a forward pass is done, but the backward pass is not. As a result, with the forward pass, the recurrent state of the card is updated with new information. The model does not learn how to classify the non-scorable instances, focusing solely on the target use-cases.

In various embodiments, the dataset is split into training, validation, and test subsets. Since this is a binary classification problem, the binary cross-entropy loss can be used to train the models. Given the data's size, an epoch is not an entire pass through the data in various embodiments. Instead, an epoch is a random sample, with replacement, of, approximately, 10% non-fraudulent cards and all fraudulent cards in the training data.

In various embodiments, predictions are determined for all events in a full period of data in the offline setting in order to obtain accurate, unbiased estimates of the performance of these models requires us to. It is similar to the validation process executed periodically during training as herein, with some differences. First, truncating sequences to the last m events is typically not feasible as a goal is to generate predictions for all transactions in a time window. Second, sequence randomness is not required since all sequences are evaluated.

Taking these two differences into account, sequences that do not contain any event in the time period are first filtered out. Then, the list of sequences is sorted by descending sequence length. This allows each batch to be composed of similarly-sized sequences, reducing the number of padded events. Finally, the batch size is adapted as the data is processed, starting with a small batch of lengthy sequences and progressively increasing the batch size as the length of the sequences decreases. Thus, the number of events in each batch remains similar, keeping the GPU memory usage stable (and high) over time.

Figure 5:
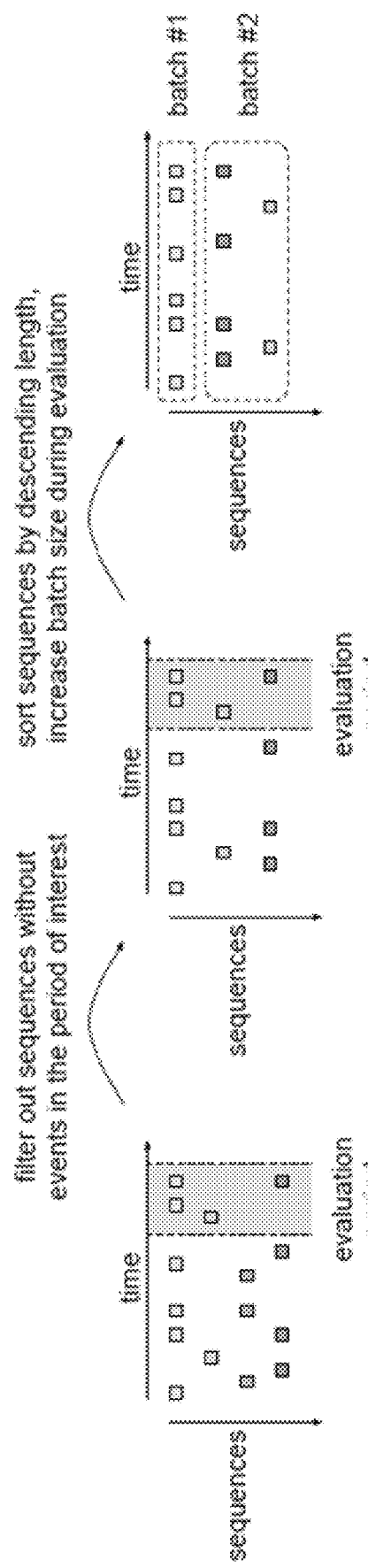
FIG. 5 is a diagram illustrating an example of a batch inference process according to an embodiment of the present disclosure.

FIG. 5 is a diagram illustrating an example of a batch inference process according to an embodiment of the present disclosure. In this example, the batch size increases from one sequence to two sequences, but the total number of events in each batch is the same, as desired.

The disclosed techniques can be incorporated into a streaming engine used to detect fraud in real-time (such as Pulse by Feedzai). The disclosed techniques enable very tight latency SLAs (time to process one event) to be met. Depending on the use-case and the client, the disclosed system may take at most 200 ms on the 99.999th percentile of the latencies distribution to process a transaction. This time includes several components, not all directly related with scoring a transaction, e.g., preprocessing and enriching data, or applying actions according to predefined business rules. In one aspect, an extremely efficient streaming inference process, where the history of each card is provided to the model is adapted as follows.

Conventionally, in a batch inference setting, sequences are typically explicitly ordered to maximize GPU usage, and minimize inference time. In streaming, this is no longer possible, since transactions are scored by the order in which they arrive to the system. In this setting, the sequence information is encoded in the recurrent states of the model and saved externally into a key-value store.

Figure 6A:
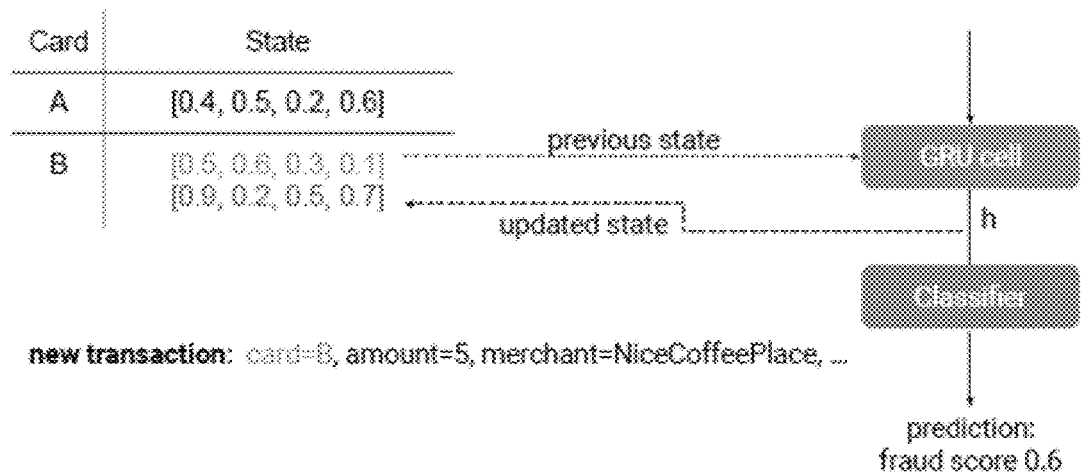
FIG. 6A shows an example of a batch inference process according to an embodiment of the present disclosure.
Figure 6B:
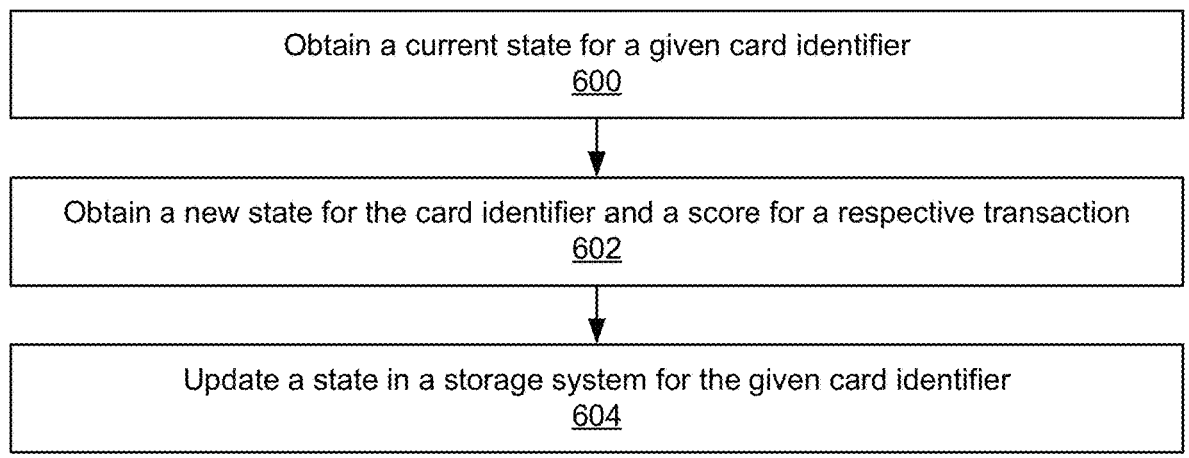
FIG. 6B is a flow chart illustrating an embodiment of a batch inference process.

FIG. 6A shows an example of a batch inference process according to an embodiment of the present disclosure. As shown, a state is stored for each card, and when a new transaction arrives, the batch inference process of FIG. 6B is performed. FIG. 6B is a flow chart illustrating an embodiment of a batch inference process. The process can be performed by fraud detection system 100, system 400, cluster 740, or device 800.

The process begins by obtaining a current state for a given card identifier (600). The state captures the history of transactions of a given card. With this, the time and space complexity of scoring each transaction is constant, regardless of how many (if any) the card has appeared before. In various embodiments, a new card without any history has its state values all initialized to 0.0.

The process obtains a new state for the card identifier and a score for a respective transaction (602). For example, the process sends the current transaction and the obtained state to a GRU cell to obtain the information.

The process updates a state in a storage system for the given card identifier (604). The storage system stores the state of each card seen by the system. Intuitively, the storage system grows linearly on the number of cards since there is one entry per card. Each entry size depends on the number of GRU layers and the size of the GRUs' states. Typically, relatively small GRUs are used to minimize state size pressure (e.g., 64 double length). By way of non-limiting example, the storage system may include or be implemented by an embedded key-value store (such as HaloDB or RocksDB) or an external storage (such as DynamoDB or Cassandra).

To minimize latency further, especially on the high-percentiles, in various embodiments, the process avoids writing to state storage synchronously (e.g., during the critical path of scoring a transaction). To this end, a small Least Recently Used (LRU) cache can be used to keep a copy of the most recently updated states in memory (RAM). To update the state of a given card, the process first writes this state to the cache, and then asynchronously writes the same state to the storage system persisted on disk. Whenever a new transaction arrives, if the transaction is not found in cache, then the process reads it from disk. The cache can be sized to hold some dozens of seconds of data to cope with hiccups on high throughput scenarios. The storage system and the cache can be included in storage 240 of FIG. 2.

In various embodiments, due to space constraints, the process asynchronously expires old entities of the storage system, periodically. This expiration happens whenever a threshold time or usage space is met.

FIG. 7 is a block diagram illustrating an embodiment of a system in which interleaved sequence RNNs can be implemented. The system includes one or more nodes in a cluster 740 that perform fraud detection. The environment includes one or more transaction devices 702, 704, 706, gateway 710, network 720, issuer 730, and a cluster 740 made up of one or more nodes 742.1, 742.2. Transaction devices 702-706 collect transaction data, and transmit the transaction data via gateway 710 to issuer 730. Issuer 730 verifies the transaction data to determine whether to approve the transaction. For example, processing a transaction involving a purchase includes receiving account information (e.g., credit/debit) and transaction details (e.g., purchase amount) at a transaction device and determining whether to approve the transaction. An approved transaction may mean that payment by the account is accepted in exchange for goods or services. A denied transaction may mean that payment by the account is denied.

In some embodiments, whether to approve or deny a transaction can be based on an assessment of the likelihood that the transaction is fraudulent by monitoring data streams using the techniques disclosed herein. In some embodiments, cluster 740 is configured to perform the techniques disclosed herein to detect anomalies and provide an indication (such as an alarm report) to issuer 730 or a third party such as a merchant.

By way of non-limiting example, transaction data may include one or more of: time of transaction, account/payment information (such as a credit card account number, a debit account number, or a bank account wire number), amount paid, currency, transaction location, merchant name, merchant address, category code, city, state, zip, country, terminal identification, authentication type, and the like. In some embodiments, account data is generated by the transaction device by processing/filtering the account information. For example, an account number can be encrypted/hashed to protect the account number. A transaction device may be implemented by a terminal, a point of sale (POS) device, or any other device that accepts account information. For example, a terminal includes a credit card terminal that processes payment based on a received credit card account number. The transaction device may receive and parse account information using a variety of electronic techniques such as a chip reader, a magnetic stripe reader, barcode scanner, etc. In some embodiments, a transaction device is associated with a location and may be identified by its associated location. For example, a brick and mortar retailer (BM) having three checkout terminals (7-3) each equipped with one of the transaction devices 702-706 may be identified by transaction devices BM7, BM2, and BM3. As another example, a transaction device is a website processing payment for goods and services purchased over the Internet.

A transaction location, which is typically associated with a transaction device, is a location where account information can be received to initiate a transaction. A transaction location may be a physical/geographical location, a location of a terminal, a Web location, and the like. Examples of transaction locations include checkout terminals, stores, a group of stores, or a system-wide (e.g., entire E-commerce merchant) location, and the like.

Misappropriated information (e.g., payment information) may be presented to a transaction device 702-706 for a purchase. If misappropriated information is used, then the transaction is fraudulent. During a transaction approval process or shortly after the transaction takes place, the disclosed techniques can be applied on the transaction to determine an action to take with respect to the transaction such as signaling that a transaction is potentially fraudulent. If applied during the transaction, a potentially fraudulent transaction may be prevented by declining the proffered payment method. If applied shortly after the transaction, the transaction may be reviewed and dis-approved or the payment method may be declined for subsequent transactions. This avoids future exploits of the payment method.

A transaction identified to be a potentially fraudulent transaction can trigger remedial action such as verifying with an issuer bank or with the card holder whether the card was used without authorization. If so, then the potentially fraudulent transaction is confirmed to be actually fraudulent. The determination of potentially fraudulent transactions may be used to block a payment type associated with the potentially fraudulent transaction from being used in the future. An anticipated transaction (e.g., future location or time) can be determined/predicted, and preempted by declining the payment type.

Gateway 710 receives transaction data from one or more transaction devices 702-706, routes the transaction data to network 720, and returns an approval or decline notice based on the approval process of network 720. Gateway 710 may include a payment acquirer or Internet Service Provider. For example, the payment acquirer may be software hosted on a third-party server that handles transmissions between a merchant (represented by transaction devices 702-706) and an issuer 730. In some embodiments, a gateway is associated with an acquiring bank (also referred to as a merchant bank). The acquiring bank is registered with a network 720, wherein the network represents a card association or card scheme (e.g., Visa®, MasterCard®, American Express®, etc.). The acquiring bank contracts with merchants to create and maintain accounts allowing the merchant to accept accounts such as credit and debit cards. In some embodiments, gateway 710 processes and encrypts the transaction data before routing the transaction data. In some embodiments, gateway 710 groups one or more transactions together and sends the batch of transactions to issuer 730 via network 720.

Network 720 is a platform for transmitting data between devices to support payment processing and electronic payments. In some embodiments, network 720 is associated with a credit card association or card scheme (e.g., Visa®, MasterCard®, American Express®, etc.) and supports communications between association members such as an acquiring bank (e.g., gateway 710) and an issuing bank (e.g., issuer 730). In some embodiments, network 720 implements a clearing house to provide clearing and settlement services. Network 720 determines an appropriate destination to route the transaction data. For example, several issuer banks may be members of the network. The network determines the issuer corresponding to the transaction data and routes the transaction to the appropriate issuer. For simplicity, only one issuer 730 is shown in FIG. 7. In some embodiments, network 720 filters the received transaction data. For example, network 720 may be aware of fraudulent accounts and determine whether the received transaction data includes a fraudulent account. Network 720 may include one or more network connected servers for processing, routing, and/or facilitating transactions.

Issuer 730 receives transaction data from network 720 and determines whether to approve or deny a transaction (e.g., a provided account/payment). For example, issuer 730 includes one or more servers/systems of an issuing bank. In some embodiments, the issuer is associated with an acquiring bank via network 720. In some embodiments, determining whether to approve or deny an account/payment method includes determining whether the transaction is potentially fraudulent.

Storage 744 stores information about transactions. Storage 744 can be implemented by or include a variety of storage devices including devices for a memory hierarchy (cache, RAM, ROM, disk). In some embodiments, storage 744 stores a list of potentially fraudulent transactions, a list (e.g., blacklist) of stolen/fraudulent accounts or other entities, and/or observed outcomes (e.g., labels) of previous transactions. The transaction information can be provided as a single transaction or a list of transactions. In some embodiments, a list of (past) transactions is stored in storage 744 for a predetermined time, and is used to analyze subsequently-received transactions to provide output.

A payment verification process may take place within the environment shown in FIG. 7. In operation, a transaction device (702, 704, and/or 706) receives transaction information such as account, time, amount, etc. as further described herein. In some embodiments, the transaction device processes the transaction information (e.g., packages the data). The transaction device sends the transaction data to gateway 710. Gateway 710 routes the received transaction data to network 720. Network 720 determines an issuer based on the transaction data, and sends the transaction data to the issuer. Issuer 730 determines whether to approve or deny the transaction and detects system problems or unusual flows of transactions based on the transaction data and a security process performed by one or more nodes 742.1, 742.2. One or more nodes 742.1, 742.2 performs security processes to analyze the received transaction data and identify anomalies. The processes shown in FIGS. 4 and 8-11 are examples of security processes performed by cluster 740.

Network 720 and gateway 710 relay an approval or decline notice back to the transaction device. If the transaction is approved, payment has been accepted and the transaction is successful. If the transaction is declined, payment has not been accepted and the transaction is declined.

In some embodiments, nodes of cluster 740 are controlled and managed by issuer 730. For example, devices/systems of the issuer or payment processing network retain transaction information and perform analysis to identify potentially fraudulent transactions. For example, the one or more nodes may be provided within the computing environment of issuer 730. In some embodiments, nodes of cluster 740 are controlled and managed by a third party. For example, issuer 730 has contracted with the third party to perform analysis using data provided to the issuer (e.g., transaction information) to identify for the issuer likely potentially fraudulent transactions.

Figure 8:
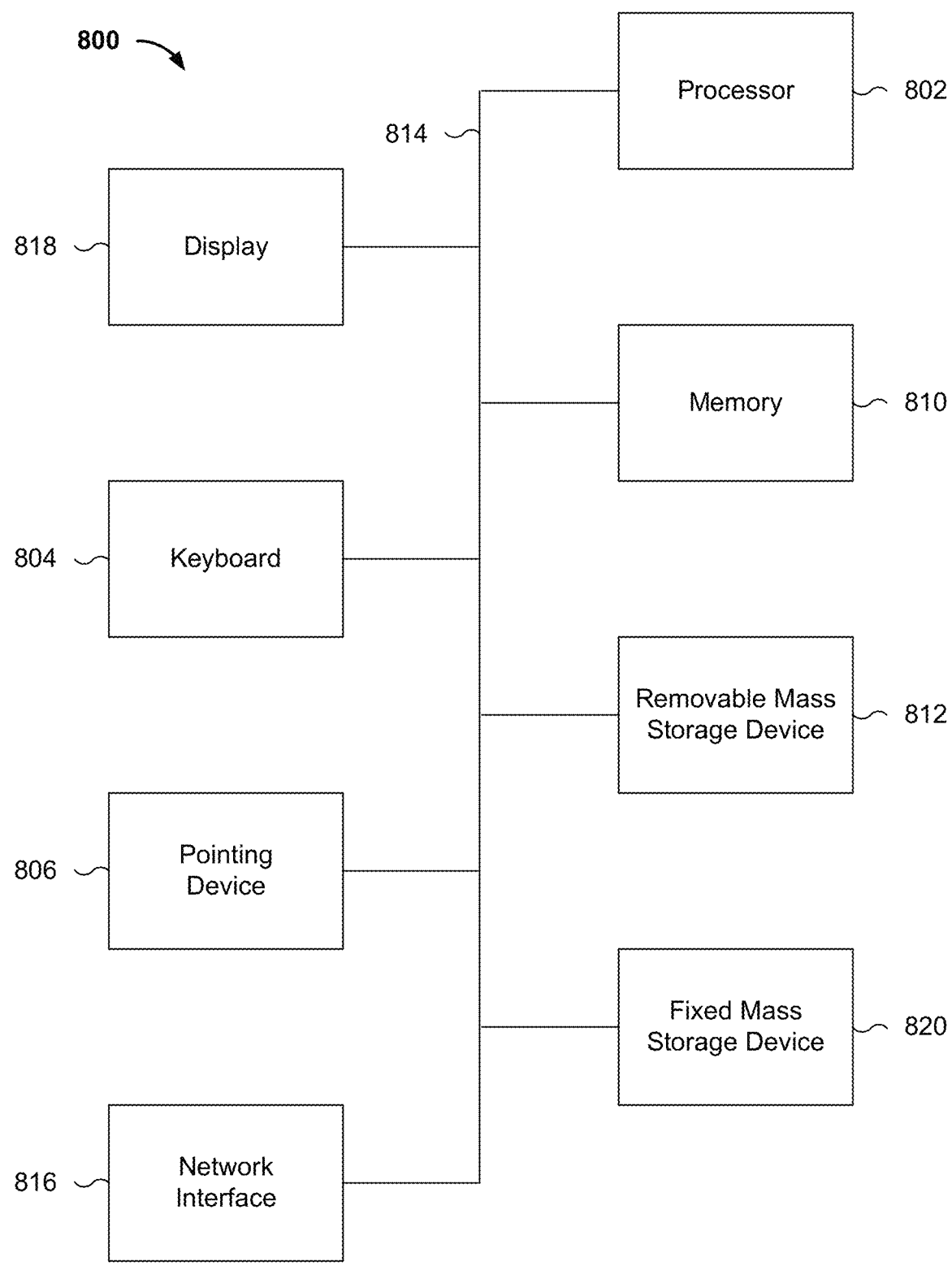
FIG. 8 is a functional diagram illustrating a programmed computer system for interleaved sequence RNNs in accordance with some embodiments.

FIG. 8 is a functional diagram illustrating a programmed computer system for interleaved sequence RNNs in accordance with some embodiments. As will be apparent, other computer system architectures and configurations can be used to perform the described techniques. Computer system 100, which includes various subsystems as described below, includes at least one microprocessor subsystem (also referred to as a processor or a central processing unit (CPU) 802). For example, processor 802 can be implemented by a single-chip processor or by multiple processors. In some embodiments, processor 802 is a general purpose digital processor that controls the operation of the computer system 100. In some embodiments, processor 802 also includes one or more coprocessors or special purpose processors (e.g., a graphics processor, a network processor, etc.). Using instructions retrieved from memory 810, processor 802 controls the reception and manipulation of input data received on an input device (e.g., pointing device 806, I/O device interface 804), and the output and display of data on output devices (e.g., display 818).

Processor 802 is coupled bi-directionally with memory 810, which can include, for example, one or more random access memories (RAM) and/or one or more read-only memories (ROM). As is well known in the art, memory 810 can be used as a general storage area, a temporary (e.g., scratch pad) memory, and/or a cache memory. Memory 810 can also be used to store input data and processed data, as well as to store programming instructions and data, in the form of data objects and text objects, in addition to other data and instructions for processes operating on processor 802. Also as is well known in the art, memory 810 typically includes basic operating instructions, program code, data, and objects used by the processor 802 to perform its functions (e.g., programmed instructions). For example, memory 810 can include any suitable computer readable storage media described below, depending on whether, for example, data access needs to be bi-directional or uni-directional. For example, processor 802 can also directly and very rapidly retrieve and store frequently needed data in a cache memory included in memory 810.

A removable mass storage device 812 provides additional data storage capacity for the computer system 100, and is optionally coupled either bi-directionally (read/write) or uni-directionally (read only) to processor 802. A fixed mass storage 820 can also, for example, provide additional data storage capacity. For example, storage devices 812 and/or 820 can include computer readable media such as magnetic tape, flash memory, PC-CARDS, portable mass storage devices such as hard drives (e.g., magnetic, optical, or solid state drives), holographic storage devices, and other storage devices. Mass storages 812 and/or 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can be used to provide access to other subsystems and devices as well. As shown, these can include a display 818, a network interface 816, an input/output (I/O) device interface 804, a pointing device 806, as well as other subsystems and devices. For example, image processing device 806 can include a camera, a scanner, etc.; I/O device interface 804 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 100. Multiple I/O device interfaces can be used in conjunction with computer system 100. The I/O device interface can include general and customized interfaces that allow the processor 802 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 816 allows processor 802 to be coupled to another computer, computer network, or telecommunications network using a network connection as shown. For example, through the network interface 816, the processor 802 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 100 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 8 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., V/O device interface 804 and display 818 share the touch sensitive screen component, which both detects user inputs and displays outputs to the user). In addition, bus 814 is illustrative of any interconnection scheme serving to link the subsystems. Other computer architectures having different configurations of subsystems can also be utilized.

Experimental results show that the disclosed techniques improve the functioning of the computer and also the technical field of automated fraud detection. A GRU-based model without profiles outperformed conventional models with profiles in the majority of the metrics. The RNN model outperformed the baseline in terms of recall, with 10% points more, and obtained 1.6% more money recall for the same dataset.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving data of a first transaction;
   retrieving a first state;
   providing the retrieved first state and an input data based on the first transaction to a machine learning trained recurrent neural network model to determine a second state including by:
     transforming an input vector into a new vector, and
     representing the new vector in a space to feed at least one layer of the recurrent neural network model;
   determining a prediction result associated with a fraud threat of the first transaction using at least (i) the first state and (ii) the input data based on the first transaction;
   updating a saved recurrent neural network state for an entity associated with the first transaction to be the second state;
   receiving data of a second transaction, wherein the second transaction is associated with the entity; and
   unlooping a neural network associated with the saved recurrent neural network state including by:
     retrieving the second state;
     providing the second state and an input data based on the second transaction to the machine learning trained recurrent neural network model to determine a third state;
     determining a prediction result associated with a fraud threat of the second transaction using at least (i) the second state and (ii) the input data based on the second transaction, wherein the second transaction is approved based at least in part on a determination that the prediction result associated with the fraud threat of the second transaction is below a threshold; and
     updating the saved recurrent neural network state for the entity to be the third state.

2. The method of claim 1, wherein:
   the first transaction and the second transaction are included in an interleaved sequence of transactions; and the interleaved sequence of transactions includes transactions received in an order in which adjacent transactions are not necessarily associated with a same entity.

3. The method of claim 2, wherein the interleaved sequence of transactions includes:
an initial transaction received at a first time, the initial transaction being associated with a first entity;
a middle transaction received at a second time after the first time, the middle transaction being associated with a second entity different from the first entity; and
a later transaction received at a third time after the second time, the later transaction being associated with the first entity.

4. The method of claim 2, further comprising:
receiving data of a third transaction, wherein the third transaction is associated with an entity different from the first transaction, and the third transaction is included in the interleaved sequence of transactions;
retrieving a first state that is a saved recurrent neural network state for the entity associated with the third transaction;
providing the retrieved first state and an input data based on data of the third transaction to a machine learning trained recurrent neural network model to determine a new second state;
determining a prediction result associated with a fraud threat of the third transaction using at least (i) the second state and (ii) the input data based on the third transaction; and
updating the saved recurrent neural network state for the entity associated with the third transaction to be the second state.

5. The method of claim 1, wherein the saved recurrent neural network state for an entity associated with the first transaction is retrieved from at least one of: gated recurrent unit (GRU) cell or a Long Short-Term Memory (LSTM) cell.

6. The method of claim 1, wherein data of the first transaction includes at least one of: a numerical field, a categorical field, a timestamp field, or an entity identification field.

7. The method of claim 1, wherein the first state includes an encoding of transactions associated with the entity associated with the first transaction.

8. The method of claim 1, further comprising batch processing transactions including by continuously and concurrently reading batches from at least one database and inserting the batch processing transactions into a queue for processing.

9. The method of claim 8, wherein the batch processing is performed in offline training.

10. The method of claim 8, further comprising:
building a first database of entities meeting a first criterion;
building a second database of entities meeting a second criterion; and
building a validation dataset using a representative sample of entities from the first database and the second database during a validation period arranged in descending order in number of transactions.

11. The method of claim 10, wherein the first criterion includes containing at least one fraudulent transaction and the second criterion is not containing any fraudulent transactions.

12. The method of claim 10, wherein building the validation dataset includes using a parameter defining a proportion of information to use from the first database and the second database in response to a determination that there is class imbalance between the first database and the second database.

13. The method of claim 10, wherein the representative sample of entities includes a random sample.

14. The method of claim 1, further comprising:
in response to a transaction being a scorable instance, performing a forward pass and a backward pass; and
in response to a transaction being a non-scorable instance, performing a forward pass without a backward pass.

15. The method of claim 1, further comprising performing a batch inference process including by:
obtaining a current state for a given card identifier; and
obtaining a new state for the card identifier and a score for a respective transaction.

16. The method of claim 1, wherein further comprising, prior to retrieving a first state that is a saved recurrent neural network state for an entity associated with the first transaction, pre-processing the input data based on data of the first transaction.

17. The method of claim 16, wherein the pre-processing includes at least one of:
creating at least one of a time feature or an entity-related feature;
fitting transformer objects for normalization, bucketing, and indexing;
applying transformers to training, validation, and test datasets;
creating a list of chronologically-sorted sequences of transactions based at least in part on the training, validation, and test datasets;
removing those sequences of transactions that do not contain any transaction in a period of interest; and
storing the sequences of transactions.

18. A system, comprising:
a processor configured to:
receive data of a first transaction;
retrieve a first state;
provide the retrieved first state and an input data based on the first transaction to a machine learning trained recurrent neural network model to determine a second state including by:
transforming an input vector into a new vector, and representing the new vector in a space to feed at least one layer of the recurrent neural network model;
determine a prediction result associated with a fraud threat of the first transaction using at least (i) the first state and (ii) the input data based on the first transaction;
update a saved recurrent neural network state for an entity associated with the first transaction to be the second state;
receive data of a second transaction, wherein the second transaction is associated with the entity; and
unloop a neural network associated with the saved recurrent neural network state including by:
retrieving the second state;
providing the second state and an input data based on the second transaction to the machine learning trained recurrent neural network model to determine a third state;
determining a prediction result associated with a fraud threat of the second transaction using at least (i) the second state and (ii) the input data based on the second transaction, wherein the second transaction is approved based at least in part on a determination that the prediction result associated with the fraud threat of the second transaction is below a threshold; and updating the saved recurrent neural network state for the entity to be the third state.

19. The system of claim 18, wherein:

each subset is stored in a separate database;

a test dataset is used to pick a model; and the test dataset includes a representative sample of entities from a first database and a second database arranged in descending order in number of transactions.

20. A computer program product embodied in a non-transitory computer readable medium and comprising computer instructions for:

receiving data of a first transaction;

retrieving a first state;

providing the retrieved first state and an input data based on the first transaction to a machine learning trained recurrent neural network model to determine a second state including by:

transforming an input vector into a new vector, and representing the new vector in a space to feed at least one layer of the recurrent neural network model;

determining a prediction result associated with a fraud threat of the first transaction using at least (i) the first state and (ii) the input data based on the first transaction;

updating a saved recurrent neural network state for an entity associated with the first transaction to be the second state;

receiving data of a second transaction, wherein the second transaction is associated with the entity; and unlooping a neural network associated with the saved recurrent neural network state including by:

retrieving the second state;

providing the second state and an input data based on the second transaction to the machine learning trained recurrent neural network model to determine a third state;

determining a prediction result associated with a fraud threat of the second transaction using at least (i) the second state and (ii) the input data based on the second transaction, wherein the second transaction is approved based at least in part on a determination that the prediction result associated with the fraud threat of the second transaction is below a threshold; and updating the saved recurrent neural network state for the entity to be the third state.

* * * * *